Patented Feb. 21, 1933

1,898,523

UNITED STATES PATENT OFFICE

OTTO BÖGER, OF DESSAU IN ANHALT, AND WERNER MÜLLER, OF LEIPZIG, GERMANY, ASSIGNORS TO GENERAL ANILINE WORKS, INC., OF NEW YORK, N. Y., A CORPORATION OF DELAWARE

TRIARYLMETHANE DYES

No Drawing. Application filed February 6, 1931, Serial No. 514,057, and in Germany February 14, 1930.

The present invention relates to new triarylmethane dyes and more particularly to such dyes deriving from tertiary amines in which the nitrogen is substituted by a higher alkyl group.

In triarylmethane dyes prepared from tertiary amines, the tinctorial power and the affinity for the fiber increase with a rising molecular size of the tertiary amines used which also influences the shade of the dye. But with the increase of the molecular weight the solubility decreases and to the increased affinity for the fiber corresponds a decrease of the levelling power.

Thus, the dyes made from benzaldehydedisulfonic acid and ethylbenzylaniline, for instance, have a considerably greater tinctorial power than the corresponding dye from diethylaniline, but their levelling power is much smaller so that for producing different shades in the boiling bath it can in practice hardly be utilized. If one tries to displace the shade of the dyeings to the long wave side of the spectrum, for instance, by introducing higher alkyl residues into the tertiary amines used for the synthesis of basic dyes, mostly dimethylarylamines or diethylarylamines, not only the dyes become insufficiently soluble but also the leuco compounds are too difficultly soluble for any normal subsequent treatment.

According to this invention it is possible to introduce into triarylmethane dyes residues of tertiary amines containing higher alkyls, while avoiding the drawbacks above mentioned by making use of such tertiary aryl amines as contain besides a butyl or another higher alkyl group a hydroxyalkyl group bound to the nitrogen atom or a sulfonation product thereof.

The dyes are otherwise made according to the usual methods. The leuco compounds which are sufficiently soluble are produced in a good yield without undesired secondary reactions taking place. In spite of the presence of alcoholic hydroxy groups their oxidation takes a normal course.

The new dyes according to this invention are well soluble; their strength of color, as compared with the small elevation of the molecular weight, is much increased, and they dye tints which, especially also in artificial light, are very clear.

The following examples illustrate the invention, the parts being by weight:—

*Example 1.*—27 parts of 4.4′-tetramethyldiaminobenzhydrol and 20 parts of butyl-hydroxyethylaminobenzene [1-(phenyl-hydroxyethylamino)-butane] of the formula

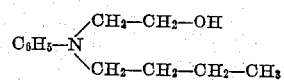

are condensed in the unual manner (cf. Möhlau and Bucherer, 1st edition, 1908, page 183 et seq.) to the leuco-base which is then oxidized. A well soluble dye which is considerably bluer and clearer than the known methyl violet brands, is obtained in a good yield. In artificial light the tint does not change a dull reddish to so great an extent as the known analogous dyes.

It probably corresponds to the following formula:

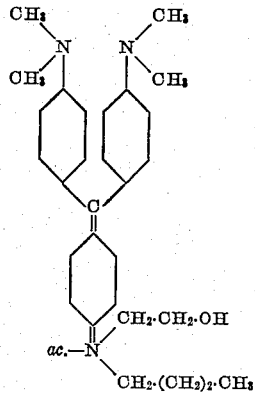

Quite a similar dye is obtained by using instead of butylhydroxyethylaminobenzene the corresponding quantities of butylhydroxypropylaminobenzene or butylhydroxybutylaminobenzene. The blue color of this dye is still clearer than that of the dye above indicated.

*Example 2.*—10.6 parts of benzaldehyde are condensed in known manner with 42.5 parts of butylhydroxyethylaminobenzene and the leuco-base is oxidized according to one of the usual methods. A green dye is obtained in a good yield which dyes the fiber a considerably more yellow and clearer tint than malachite green and ethyl green. The dyeings are especially beautiful in artificial light.

Probably it corresponds to the formula:

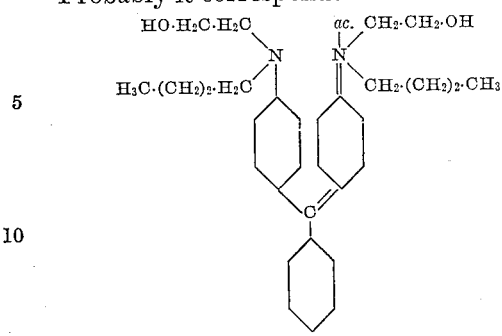

Instead of butylhydroxyethylaminobenzene other hydroxyalkylbutylanilines may be used, whereby similar dyes are obtained. It is also possible to use instead of benzaldehyde other aldehydes, such as naphthaldehyde, etc. The dyes prepared from naphthaldehyde dye somewhat more yellow tints.

*Example 3.*—26.6 parts of benzaldehyde-2.4-disulfonic acid are condensed in the usual manner in dilute sulfuric acid with 43 parts of butyl-hydroxyethylaminobenzene. The separating leuco compound is oxidized in known manner, for instance, with pyrolusite in the presence of sulfuric acid and formic acid. After salting out, 63.4 parts of a dye free from salt are obtained which dyes wool and silk as strongly as 1½ its weight of the corresponding dye from benzaldehyde-2.4-disulfonic acid and diethylaminobenzene. The levelling power of the new dye is equal to that of the known dye just mentioned. The changement of the tint to dull green in artificial light is more marked with the said known dye than with the dye made according to this example.

The new dye probably corresponds to the formula:

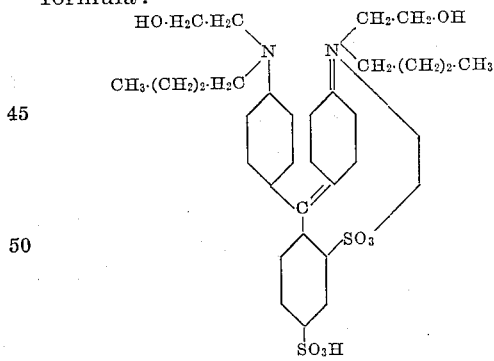

When using instead of butylhydroxyethylaminobenzene the corresponding quantity of butylhydroxypropylaminobenzene or of butylhydroxybutylaminobenzene, the dyes obtained therewith dye wool and silk as intensely as 1½ to 1¾ their weight of the dye made with diethylaminobenzene.

*Example 4.*—31.6 parts of 1-naphthaldehyde-2.4-disulfonic acid are condensed, as described in Example 3, with 43 parts of butylhydroxyethylaminobenzene and the leuco compound is oxidized. 68.4 parts of a dye free from salt are obtained dyeing wool and silk as intensely as does 1½ times its weight of the corresponding dye prepared from 1-naphthaldehyde-2.4-disulfonic acid and diethylaminobenzene. The levelling power of the new dye is like that of the known dye mentioned. The shade of the new dye is, as is much desired, considerably more yellow and in the case of evening illumination it is much more clearly yellow than that of the known dye.

Probably it corresponds to the formula:

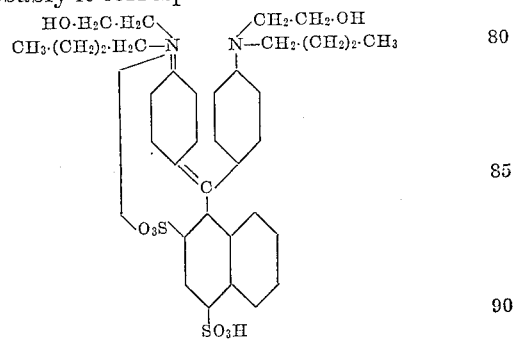

*Example 5.*—30.6 parts of formaldehyde of 30 per cent strength are condensed in the usual manner in the presence of a catalytic amount of a weak organic acid with 109 parts of butylhydroxyethylaminobenzene so as to form 4.4'-di-(butylhydroxyethylamino)-diphenyl methane which is oxidized in the usual manner, for instance, with lead peroxide and sulfuric acid, to the corresponding benzhydrol. The benzhydrol is condensed according to British Specification No. 19,062/1891 with ethylbenzylanilinedisulfonic acid. The leuco sulfonic acid obtained is oxidized. A dye is obtained which dyes wool and silk clear blue tints as intensely as does 1½ its weight of the dye prepared from tetramethyldiaminobenzhydrol and ethylbenzylanilinedisulfonic acid. The shade which represents itself in evening illumination is particularly remarkable. Whereas the dyes obtained according to the said specification yield dyeings which, in artificial light, have an undesired much redder appearance, the tint of the new dye according to this example hardly alters in artificial light.

Probably its formula is the following:

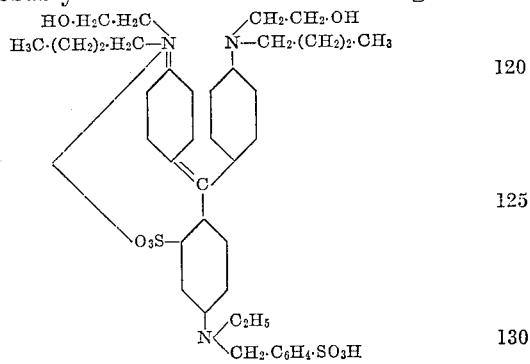

*Example 6.*—26.6 parts of benzaldehyde-2.4-disulfonic acid are condensed in the usual manner in the presence of dilute sulfuric acid with 45.5 parts of amylhydroxyethylaminobenzene. The separating leuco compound is oxidized in known manner, for instance, with pyrolusite in the presence of sulfuric acid and formic acid. After salting out, 66.2 parts of a dye free from salt are obtained which dyes wool and silk as strongly as 1½ its weight of the corresponding dye from benzaldehyde-2.4-disulfonic acid and diethylaminobenzene. The levelling power of the new dye is equal to that of the known dye just mentioned. The changement of the tint to dull green in artificial light is more marked with the said known dye than with the dye made according to this example.

The new dye probably corresponds to the formula:

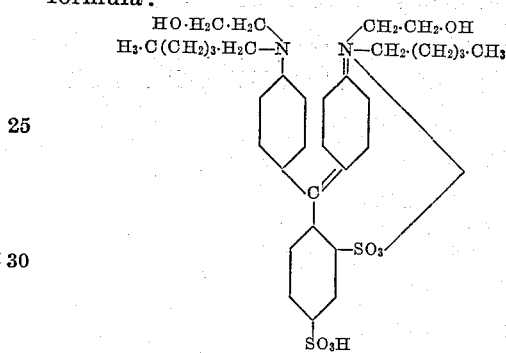

When using instead of amylhydroxyethylaminobenzene the correspondent quantity of heptylhydroxyethylaminobenzene, the dye obtained therewith dyes wool and silk as intensely as 1½ to 1¾ their weight of the dye made with diethylaminobenzene.

*Example 7.*—81.9 parts of the sulfonation product of butylhydroxyethylaniline are condensed in the usual manner with 10 parts of formaldehyde of 30 per cent strength at about 50° C. The quantity of the butylhydroxyethylaniline is thus calculated that only two thirds of the latter are consumed by the amount of the formaldehyde used to form by condensation the corresponding aminodiphenylmethane while the remaining third of the aminobenzene derivative used remains present in the reaction mixture to form the triarylmethane dye by the following reaction. Now, to the reaction mixture an aqueous solution of 20 parts of $Na_2Cr_2O_7 \cdot 2H_2O$ is added, an oxidation is carried out for about 24 hours at 50° C. while adding slowly 15 parts of dilute sulfuric acid. The dye solution formed is separated from the chromic hydroxide by filtration and after addition of common salt the dye is separated in the known manner. It dyes wool and silk remarkably clear blue violet tints as intensely as does 1½ its weight of the dye formyl-Violet S4B (see Schultz, Julius, Farbstofftabellen, 6th edition, vol. I, No. 530).

Our new dye probably corresponds to the following formula:

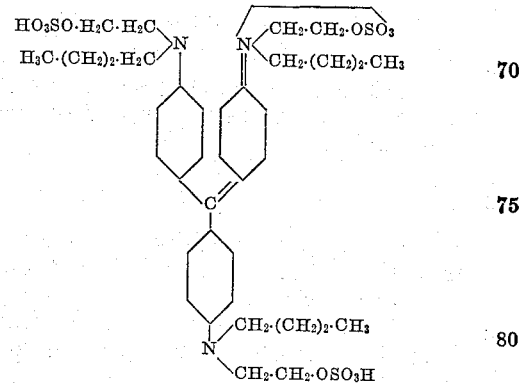

Instead of butylhydroxyethylaminobenzene other hydroxyalkylalkylanilines as, for instance, amylhydroxyethylaniline or heptylhydroxyethylaniline may be used. The dyes prepared from these aminobenzene derivatives dye somewhat bluer tints and have a still better tinctorial power. The higher alkylhydroxyalkylaminobenzenes used as starting materials are obtainable by acting with an alkylene oxide in a closed vessel upon a corresponding secondary alkylarylamine at a temperature higher than 100° C.

This process is disclosed in the copending application Ser. No. 499,416 filed by Werner Müller on December 1, 1930. As seen from the examples of our present specification, a hydroxyethyl, a hydroxypropyl or a hydroxybutyl group may be a substituent in an amino group of our new dyes. On the other hand, we have disclosed propyl, butyl, amyl and heptyl as a second substituent in the said amino group. It may be said that it is possible to prepare in a completely analogous manner other triarylmethane dyes in which one, two or three amino groups are substituted by hydroxyalkyl and alkyl groups containing more C atoms than those enumerated above. Since, however, the starting materials enumerated in the examples, are obtainable without difficulties, we prefer to synthesize our new dyes with these compounds.

What we claim is:—

1. Triarylmethane dyes containing in their molecule a basic group of the general formula

X meaning hydroxyalkyl, sulfonated hydroxyalkyl, Y meaning alkyl containing at least 3 carbon atoms.

2. Triarylmethane dyes containing in their molecule a basic group of the general formula

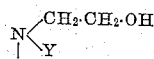

Y meaning alkyl containing at least 3 carbon atoms.

3. Triarylmethane dyes containing in their molecule a basic group of the formula

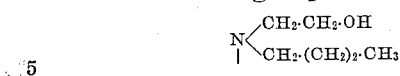

4. Triphenylmethane dyes containing in their molecule a basic group of the general formula

X meaning hydroxyalkyl, sulfonated hydroxyalkyl, Y meaning alkyl containing at least 3 carbon atoms.

5. Triphenylmethane dyes containing in their molecule a basic group of the general formula

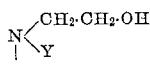

Y meaning alkyl containing at least 3 carbon atoms.

6. Triphenylmethane dyes containing in their molecule a basic group of the formula

7. As a new product the new triphenylmethane dye corresponding probably to the formula:

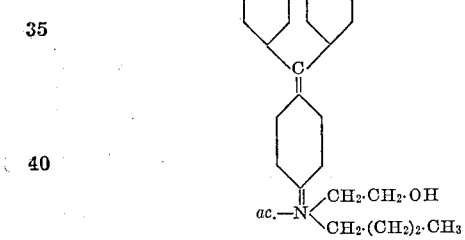

being easily soluble in water, dyeing wool and silk clear, bluish violet tints, and showing an excellent levelling power.

8. As a new product the new triphenylmethane dye corresponding probably to the formula:

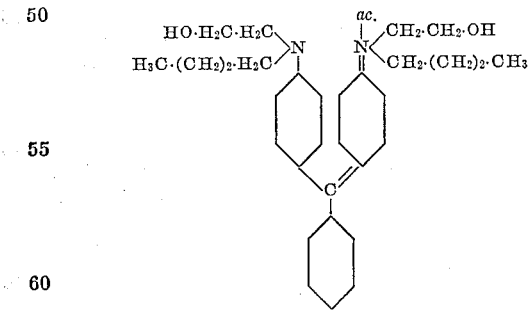

being easily soluble in water, dyeing wool and silk clear, yellowish-green tints, and showing an excellent levelling power.

9. As a new product the new triphenylmethane dye corresponding probably to the formula:

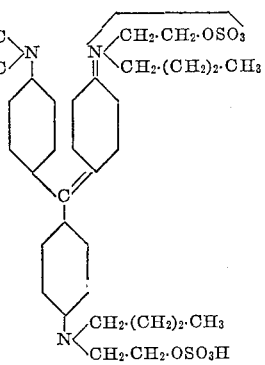

being easily soluble in water, dyeing wool and silk clear, bluish-violet tints, and showing an excellent levelling power.

In testimony whereof, we affix our signatures.

OTTO BÖGER.
WERNER MÜLLER.